United States Patent
Girt

(10) Patent No.: US 6,794,787 B2
(45) Date of Patent: Sep. 21, 2004

(54) BYPASS MOTOR FAN ASSEMBLY HAVING AN INTEGRAL BRUSH CLAMP AND VENT COVER RETENTION CLIP AND METHOD FOR ASSEMBLING THE SAME

(75) Inventor: Kenneth J. Girt, Massillon, OH (US)

(73) Assignee: Ametek, Inc., Kent, OH (US)

( * ) Notice: Subject to any disclaimer, the term of this patent is extended or adjusted under 35 U.S.C. 154(b) by 138 days.

(21) Appl. No.: 10/232,585

(22) Filed: Aug. 31, 2002

(65) Prior Publication Data

US 2004/0041493 A1 Mar. 4, 2004

(51) Int. Cl.[7] .............................................. H02K 39/38
(52) U.S. Cl. ...................................... 310/238; 310/239
(58) Field of Search ................................. 310/238–247

(56) References Cited

U.S. PATENT DOCUMENTS 3,902,088 A * 8/1975 Guglielmo ................... 310/246
5,642,012 A * 6/1997 Boggs, III ................... 310/239
5,736,805 A * 4/1998 Hyatt et al. .................. 310/249

* cited by examiner

Primary Examiner—Thanh Lam
(74) Attorney, Agent, or Firm—Renner, Kenner, Greive, Bobak, Taylor & Weber

(57) ABSTRACT

A bypass motor fan assembly having an integral vent cover retention clip includes a motor assembly having a motor bracket which carries at least a pair of motor brushes. A vent cover is coupled to the motor assembly and is retained by the clip. The integral clip is secured to the motor bracket for slidably retaining a motor brush and for retaining the vent cover to the motor bracket. The vent cover includes a pair of brush caps having a ledge and a downwardly extending rim. The integral clip includes a deflectable finger which is engaged by the ledge. The integral clip further includes a brush clamp having a top member, wherein the deflectable finger extends from the top member. The deflectable finger has a deflection section, wherein the rim initially engages the deflection section and the deflection section engages the ledge after the rim clears the deflection section. A method for assembling the vent cover to the motor assembly using the clip is also disclosed.

14 Claims, 4 Drawing Sheets

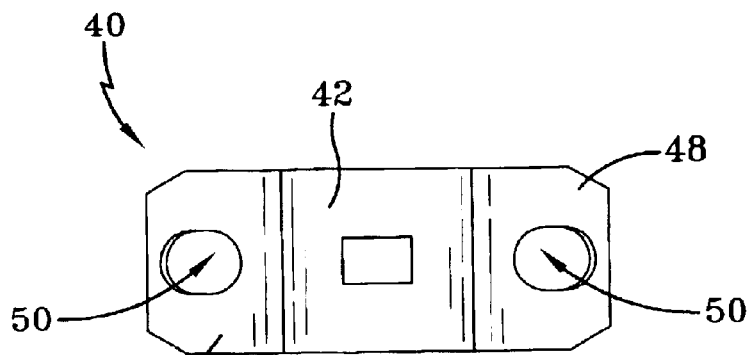
FIG-2
PRIOR ART
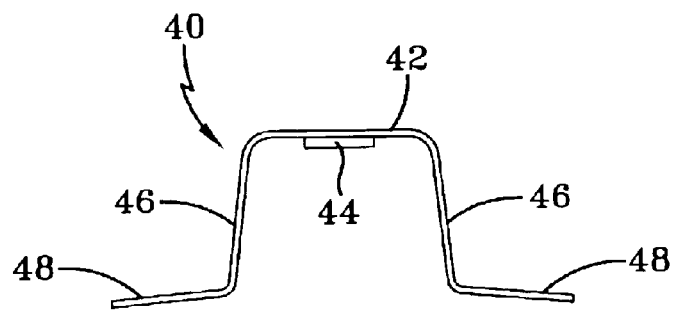
FIG-3
PRIOR ART
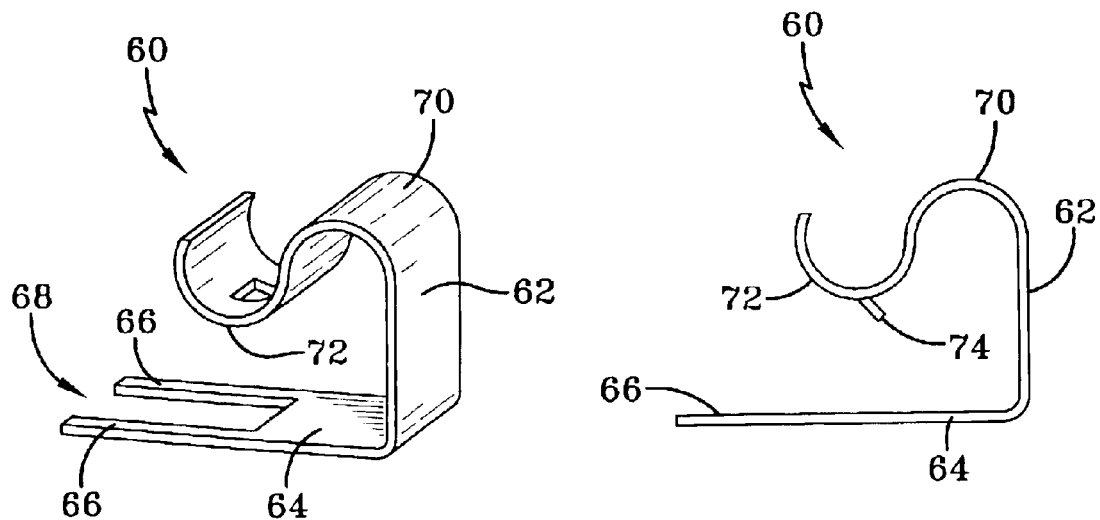
FIG-4
PRIOR ART
FIG-5
PRIOR ART 
BYPASS MOTOR FAN ASSEMBLY HAVING AN INTEGRAL BRUSH CLAMP AND VENT COVER RETENTION CLIP AND METHOD FOR ASSEMBLING THE SAME

TECHNICAL FIELD

The present invention herein resides generally in the art of motor assemblies. In particular, the present invention relates to bypass motor fan assemblies which employ a vent cover. Specifically, the present invention is directed to a brush clamp clip that functions to hold a motor brush in place while also retaining the vent cover to the motor assembly.

BACKGROUND ART

Bypass motor fan assemblies are used in various types of industrial and commercial applications. One of their more common applications is for vacuum devices wherein a fan is rotated by a motor shaft to draw working air into a housing and wherein the air is exhausted radially out the housing. This working air does not come in contact with the motor windings and as such is normally dirt-free and moisture-free. In order for the motor assembly to operate properly the motor is cooled by at least one cooling fan that is driven by the same motor shaft.

In order to ensure the safe operation of the motor cooling fan, a vent cover is disposed over the cooling fan and attached to the motor assembly to prevent foreign objects from interfering with the rotation of the fan and to keep other foreign matter away from the motor assembly. In the past, these vent covers were secured to a motor holding bracket by a friction fit. For those vent covers which are secured only by frictional forces it has been found that the vent cover is easily dislodged and accordingly poses a safety and reliability problem.

One solution for retaining the vent cover to the motor assembly is shown in FIGS. 1–7. As can be seen in the drawings, a bypass motor fan assembly is designated generally by the numeral 20. The assembly 20 includes a fan housing 22 which is secured to a fan end bracket 24. Secured to an opposite side of the fan end bracket 24 is a motor assembly 26 which provides a rotating shaft which rotates a fan (not shown) that is enclosed by the fan housing 22. The motor assembly 26 includes a motor bracket 28 which carries at least a pair of motor brushes 30 which are in contact with the commutator of the motor assembly 26. As used herein, reference to motor brush 30, may be to just a brush or to a sleeve-type housing which carries and spring biases the brush. A cooling fan (not shown) is rotated by the motor shaft and is carried at the end of the shaft opposite the working air fan. The brush 30 is secured to the motor bracket 28 by a brush clamp 40. As best seen in FIGS. 2–4, the brush clamp 40 is an inverted U-shaped metallic piece which has a top member 42 which may be provided with a detent 44 that retains the motor brush 30 in place. Downwardly extending from the edges of the top member 42 are a pair of sides 46 from which perpendicularly extend a flange 48. Flange holes 50 extend through the flanges 48 to allow for receipt of fasteners 52 which secure the brush clamp 40 to the motor bracket and which allow for retention of the motor brush 30.

After the brush clamp 40 is secured to the motor bracket to retain the motor brush 30, the vent cover 32 is positioned over the motor bracket and axially positioned in a proper orientation to permit a friction fit between the vent cover 32 and the motor bracket 28. A prior art clip, designated generally by the numeral 60, as best seen on the left side of FIG. 1 and in FIGS. 5–7, is installed radially to secure the vent cover 32 to the brush clamp 40 and the motor bracket 28.

The clip 60 includes a leg portion 62 from which substantially perpendicularly extends a foot 64. Further extending in the same direction as the foot 64 are a pair of tines 66 which form a slot 68. Extending substantially perpendicularly from the leg portion 62 is a shoulder portion 70. Further extending from the shoulder portion is a bend 72 which has a downwardly extending tab 74. The tab 74 preferably extends in a direction toward the leg portion 62.

It will be appreciated that the tines 66 are inserted between the top member 42 and the top surface of the motor brush 30. The slot 68 receives the detent 44 such that the clip 60 may be fully inserted into the brush clamp 40. As the clip 60 is radially directed between the brush clamp 40 and the brush 30, the bend portion 72 contacts a portion of the vent cover and is primarily deflected or pivoted at the shoulder portion 70 until a clearance is obtained and the shoulder portion 70 returns to its original position. The tab 74 functions to hold onto a corresponding surface of the vent cover and as such the clip cannot be radially withdrawn until the shoulder portion 70 is pivoted upwardly, and the tab 74 no longer contacts the vent cover 32.

Although the prior art clip 60 is effective, several drawbacks have come to light. It has been found that the clip 60 retains the vent cover in such a manner that makes it difficult to service or repair the cooling fan or any component of the motor assembly. This is primarily attributable to the fact that the bend portion 72 must be pivoted upwardly at the shoulder portion 70 while simultaneously applying an outward radial force. Such a procedure is quite difficult and often results in breakage of the clip on the vent cover at the shoulder portion of the clip. It has also been found that manually installing the clip 60 in a manufacturing environment leads to concerns about repetitive motion stresses to the worker who is installing the clips. It has also been found that the clips 60 are sometimes difficult to align and, as such, the vent cover may not be properly secured to the motor bracket as required for safe operation of the attached motor fan assembly.

Therefore, based upon the foregoing, there is a need in the art for a more reliable way to secure a vent cover to a motor assembly and to provide a clip or retention device that is more reliable in operation and in installation.

SUMMARY OF THE INVENTION

Therefore, it is a first aspect of the present invention to provide a bypass motor fan assembly having a vent cover retention clip, comprising a motor assembly having a motor bracket which carries at least a pair of motor brushes; a vent cover coupled to said motor assembly; and an integral clip secured to said motor bracket for slidably retaining said motor brushes and for retaining said vent cover to said motor bracket.

Another aspect of the present invention, which shall become apparent as the detailed description proceeds, is an integral brush clamp and vent cover retention clip for retaining a vent cover to a motor assembly, comprising a brush clamp attachable to the motor assembly; and a deflectable finger integrally extending from said brush clamp, said deflectable finger securable to the vent cover, wherein said deflectable finger is pivotable with respect to said brush clamp.

Other aspects of the present invention are attained by a method for assembling a motor assembly having a vent cover, comprising assembling a motor assembly having a motor bracket; retaining at least one motor brush to said motor bracket with an integral brush clamp and vent cover retention clip; and pressing a vent cover on to said motor bracket after said clamping step such that said clip retains said vent cover.

BRIEF DESCRIPTION OF THE DRAWINGS

For a complete understanding of the objects, techniques and structure of the invention, reference should be made to the following detailed description and accompanying drawings, wherein:

FIG. 2 is a top view of a prior art brush clamp;

FIG. 3 is an elevational view of the prior art brush clamp;

FIG. 4 is a perspective view of a prior art retention clip;

FIG. 5 is an elevational view of the prior art retention clip;

MODE FOR CARRYING OUT THE INVENTION

Figure 6:
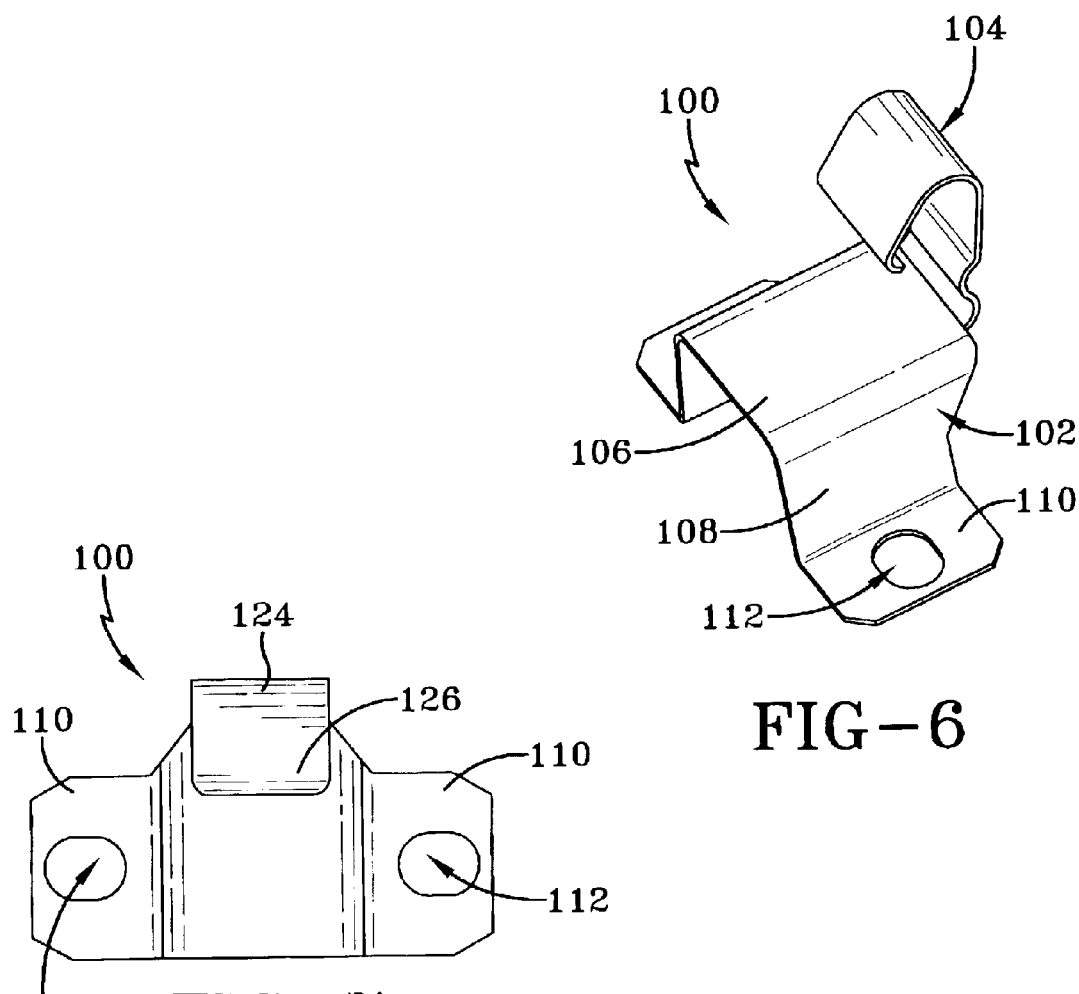
FIG. 6 is a perspective view of the integral brush clamp and vent cover retention clip according to the present invention.
Figure 7:
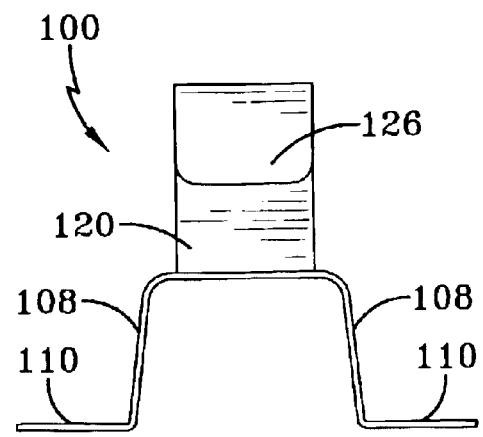
FIG. 7 is a top view of the retention clip according to the present invention.
Figures 8, 9:
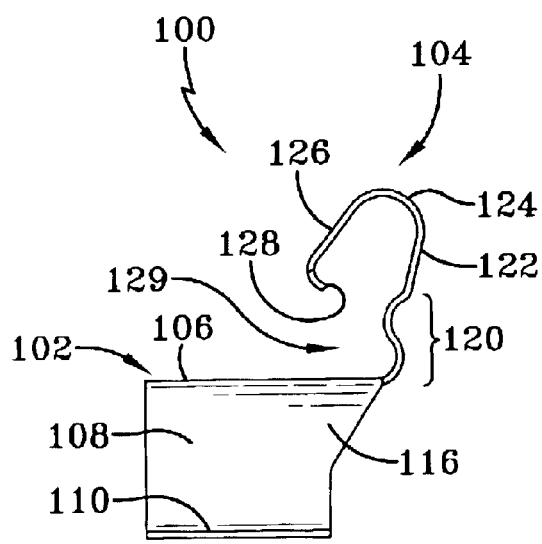
FIG. 8 is a front elevational view of the retention clip according to the present invention.
FIG. 9 is a side elevational view of the retention clip according to the present invention.

Referring now to FIGS. 1, and 6–11, an integral brush clamp and vent cover retention clip according to the present invention is designated generally by the numeral 100. As best seen in FIG. 6, the clip 100 includes a brush clamp 102 integrally connected to a deflectable finger 104. The clip 100 is preferably made of a spring steel material or a suitable non-metallic material which has spring-like properties.

The brush clamp 102 includes a top member 106 which has downwardly extending sides 108. Sides 108 are substantially perpendicular to the top member 106. Extending outwardly from each side 108 is a flange 110 which is substantially parallel to the top member 106. Each flange 110 provides a flange hole 112 therethrough for receiving fasteners 114 for the purpose of securing the brush clamp 102 to the motor bracket 28. A brace portion 116 may be provided between the top member 106 and the sides 108 inasmuch as the top member 106 may be of slightly longer length than the sides 108.

The deflectable finger 104 extends from a back edge of the top member 106 in a direction opposite that of the sides 108. The deflectable finger 104 includes an S-shaped pivot section 120. The S-shape provides rigidity and a spring force to the deflectable finger 104. Extending in the same direction as the pivot section 120 is a back section 122. Further extending from the back section 122 is a curved section 124. A deflection section 126 extends from the curved section 124 and is directed in a direction back toward the top member 106. Curved inwardly from the deflection section 126 toward the pivot section 120 is a lip section 128. Formed between the lip section 128 and the top member 106 is a gap 129.

Figure 1:
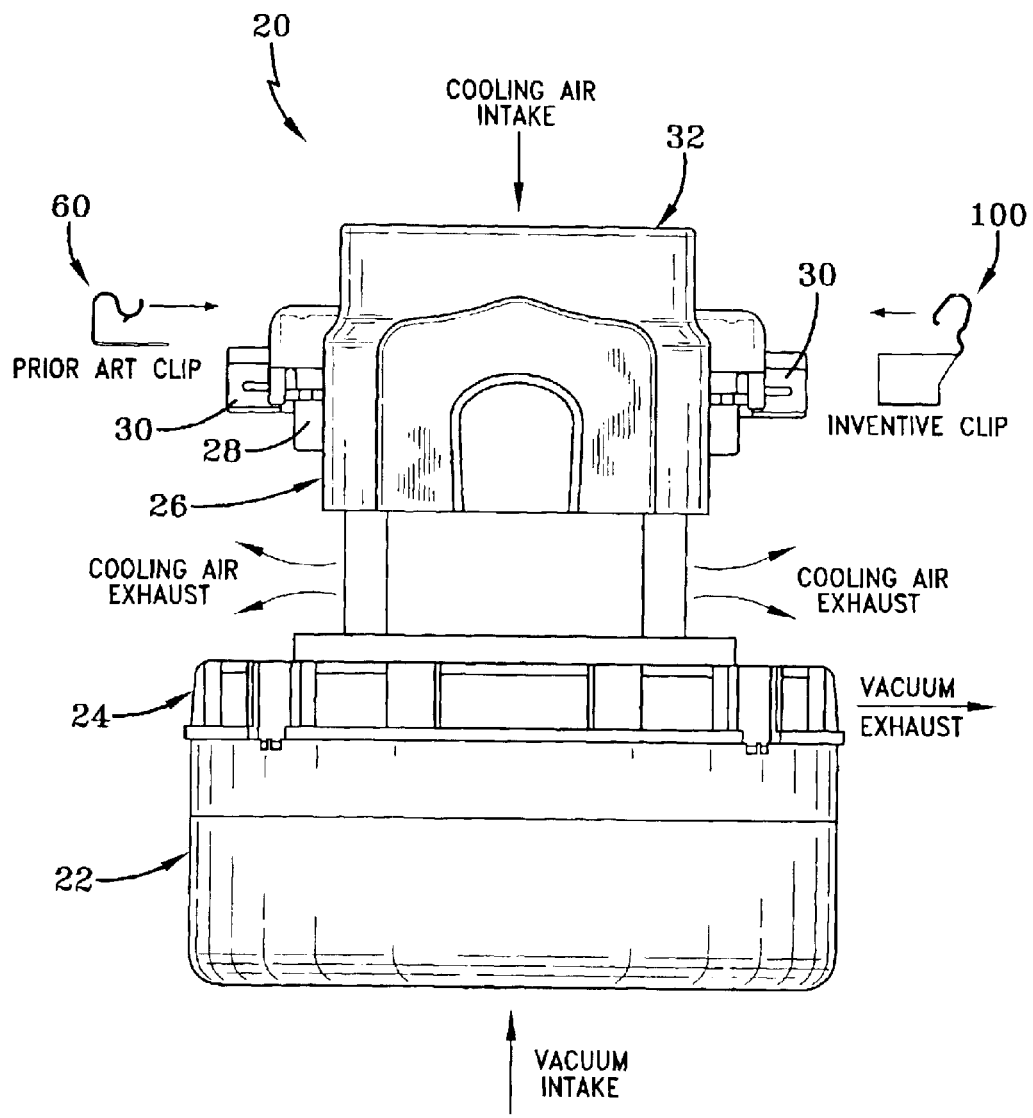
FIG. 1 is an elevational view of a bypass motor fan assembly which shows a prior art retention clip on the left and an integral brush clamp and vent cover retention clip according to the present invention on the right.
Figure 10:
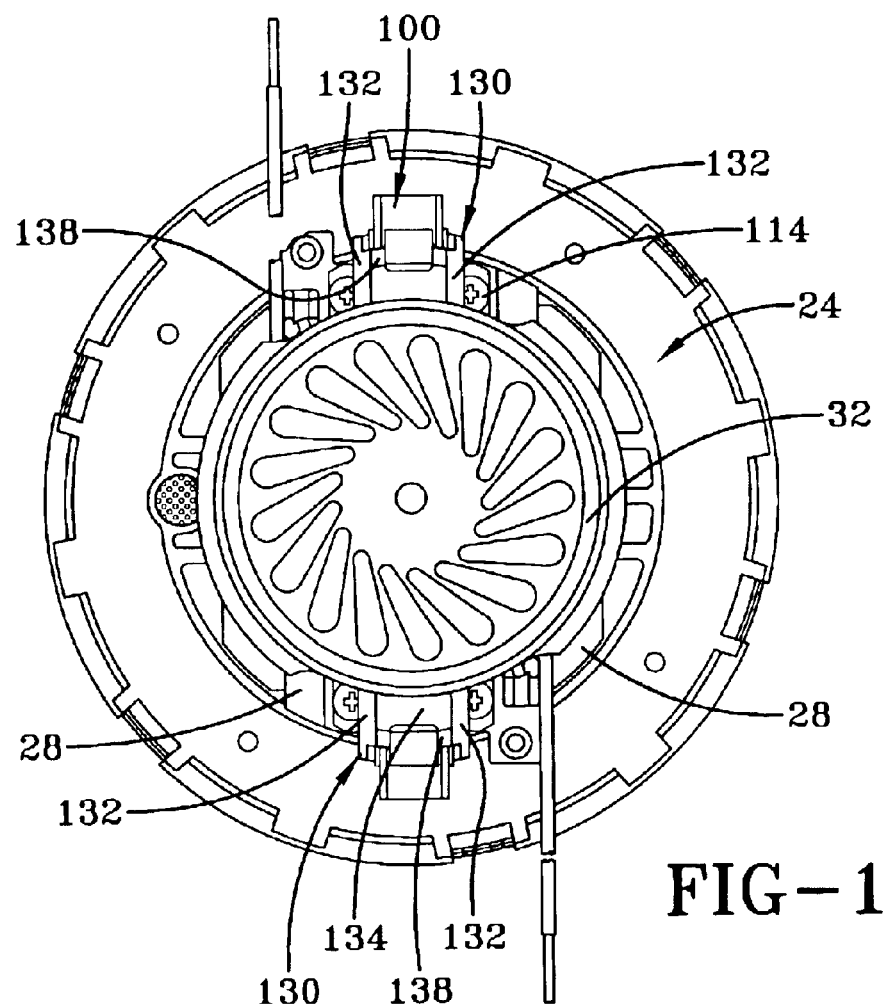
FIG. 10 is a top view of the motor fan assembly utilizing the vent cover retention clip according to the present invention.
Figure 11:
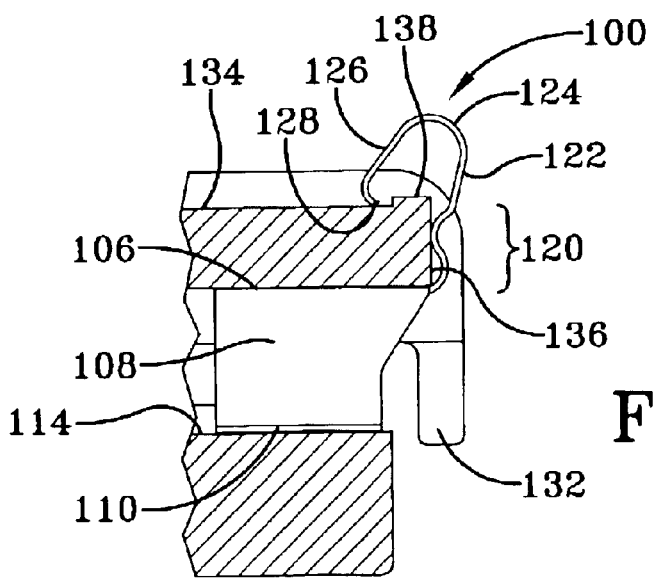
FIG. 11 is an enlarged view of the vent cover retention clip securing the vent cover to the motor bracket.

As best seen on the right side of FIG. 1 and in FIGS. 10–11 the vent cover 32 includes a brush cap 130 which may or may not have a pair of downwardly extending spaced apart legs 132. The legs 132 are spaced wide enough to accommodate the top member 106 and the sides 108 of the clip 100. Extending radially outwardly from the vent cover 32 and between the legs 132 is a ledge 134. Extending downwardly from the ledge 134 is a rim 136 and extending slightly upwardly from the ledge 134 is a ridge 138.

In assembly of the motor assembly 20 utilizing the retention clip 100 it will be appreciated that the brush clamp 102 is installed so as to retain the motor brush sleeve in a position such that the brush carried by the sleeve can contact a commutator of the motor assembly 26. Although not shown, the brush is spring-biased within the sleeve to make contact with the commutator. The brush clamp 102 is appropriately positioned upon the motor bracket 28 and the fasteners 114 are inserted through the flange holes 112 to secure the clip 100 to the motor bracket. When securing the brush clamp 102 to the motor bracket it will be appreciated that the deflectable finger 104 is placed in a radially outward position with respect to the motor bracket 28. It will also be appreciated that in the typical motor assembly there are two motor brushes secured 180° from one another to the motor bracket 28. Both of the brush clamps 102 are installed prior to installation of the vent cover 32.

Once the brush clamps 102 are securely installed to the motor bracket, the vent cover 32 is aligned and oriented such that the legs 132 are positioned over the motor brushes 30. A downward axial force is then applied to the vent cover so as to position the legs on both sides of a respective motor brush. As a downward force is exerted on the vent cover 26, the rim 136 comes in contact with the deflectable finger 104 and, in particular, the deflection section 126. As the axial force is applied, the deflection section 126 is forced radially outwardly such that the pivot section 120 is pivoted radially outwardly in a corresponding manner and a spring force is stored. As soon as the ledge 134 clears the deflection section 126 and the lip section 128, the ledge 134 fits into the gap 129. And the spring force stored in the pivot section 120 is released and the deflection section 126 and the lip section 128 return to substantially their original position. As a result, the lip section 128 is retained by the ridge 138 so as to ensure retention of the vent cover by the clip 100.

When the vent cover 32 needs to be removed, the technician simply exerts an outward radial force on the deflection section 126. This force causes the deflectable finger to pivot at the pivot section 120 so that the lip section 128 is lifted upwardly and disengages the ridge 138. Further application of the radial force causes the lip section and the deflection section to move outwardly and allow the rim to come in contact therewith. The vent cover may then be lifted axially and removed.

Based upon the foregoing, the advantages of the present invention and the method for assembling the vent cover to the motor assembly are readily apparent. First, a manufacturing step in assembling the vent cover to the motor bracket is eliminated. In particular, the clip 100 is an integral piece and there is no need for a separate step of inserting the clip between the brush clamp and the vent cover after the vent cover is already installed. In other words, the brush clamp portion is installed in a regular manner and the vent cover is installed in a regular manner without the need for the extra step of inserting a separate clip to hold the two pieces together.

Still yet another advantage of the present invention is that the deflectable finger is configured such that the pivot section 120 is immediately adjacent the top member which is in distinct contrast to the prior art clip which provided its pivoting feature at an area away from the top member. It is believed that the pivot section of the clip 100 allows a greater holding force to be applied in retaining the cover in a safe and reliable manner. Further, the present invention is advantageous in that the inwardly extending lip engages a ridge of the vent cover so as to preclude inadvertent withdrawal of the vent cover to maintain its safety features.

Still yet another advantage of the present invention is that by employing a S-shape area to the pivot section 120 the clip is much stronger and durable than the previous embodiment. As such, the vent cover can be easily removed and re-installed numerous times without breaking the clip portion such that it does not need to be replaced as well.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A bypass motor fan assembly having a vent cover retention clip, comprising:
   a motor assembly having a motor bracket which carries at least a pair of motor brushes;
   a vent cover coupled to said motor assembly; and
   an integral clip secured to said motor bracket for retaining said motor brushes and for retaining said vent cover to said motor bracket, said clip having an axially extending member which retains said vent cover.

2. A bypass motor fan assembly having a vent cover retention clip, comprising:
   a motor assembly having a motor bracket which carries at least a pair of motor brushes;
   a vent cover coupled to said motor assembly;
   an integral clip secured to said motor bracket for retaining said motor brushes and for retaining said vent cover to said motor bracket; and
   wherein said vent cover comprises a pair of brush caps each having a ledge and a downwardly extending rim; and wherein said integral clip comprises a deflectable finger which engages said ledge.

3. The assembly according to claim 2, wherein said integral clip further comprises a brush clamp having a top member, said deflectable finger extending from said top member, said deflectable finger having a deflection section, wherein said rim initially engages said deflection section and after said rim clears said deflection section engages said ledge after said rim clears said deflection section.

4. The assembly according to claim 3, wherein said vent cover further comprises a ridge that extends up from said ledge and said integral clip further comprises a lip section that extends from said deflection section, wherein said lip section is retained by said ridge when said vent cover is coupled to said motor assembly.

5. The assembly according to claim 4, wherein said brush clamp further comprises:
   a pair of sides extending downwardly from said top member;
   a flange extending substantially perpendicularly from each said side, each said flange having a flange hole therethrough for receiving fasteners to attach said brush clamp to said motor bracket.

6. The assembly according to claim 5, wherein said deflectable finger further comprises:
   an S-shaped pivot section extending upwardly from said top member;
   a back section extending from and in substantially the same direction as said S-shaped pivot section; and
   a curve section extending between said back section and said deflection section, wherein said deflection section extends in a direction substantially opposite said back section.

7. A brush clamp and vent cover retention clip for retaining a vent cover to a motor assembly, comprising:
   a brush clamp attachable to the motor assembly; and
   a deflectable finger integrally extending from said brush clamp, said deflectable finger securable to the vent cover, wherein said deflectable finger is pivotable with respect to said brush clamp.

8. The clip according to claim 7, wherein said brush clamp comprises a top member, and wherein said deflectable finger is pivotable with respect said top member.

9. The clip according to claim 8, wherein said brush clamp further comprises a pair of sides downwardly extending from said top member and a flange extending substantially perpendicularly from each said side, each said flange having a flange hole therethrough for receiving a fastener attachable to the motor assembly.

10. The clip according to claim 9, wherein said deflectable finger comprises:
    an S-shaped pivot section extending upwardly from said top member;
    a back section extending from and in substantially the same direction as said S-shaped pivot section;
    a deflection section; and
    a curve section extending between said back section and said deflection section, wherein said deflection section extends in a direction substantially opposite said back section, and wherein said deflection section is engageable by the vent cover.

11. The clip according to claim 10, wherein said deflectable finger is capable of retaining the vent cover.

12. A method for assembling a motor assembly with a vent cover, comprising:
    assembling a motor assembly having a motor bracket;
    retaining at least one motor brush to said motor bracket with an integral brush clamp and vent cover retention clip;
    providing said clip with a top member and downwardly extending sides to slidably retain said at least one motor brush;
    providing said clip with a deflectable finger that extends from said top member;
    pressing the vent cover onto said motor bracket after said retaining step;
    providing said vent cover with a radially extending brush cap having a downwardly extending rim; and
    deflecting said deflectable finger with said rim during said pressing step so as to pivotally move said deflectable finger at said top member until said brush cap clears said deflectable finger such that said clip retains said vent cover.

13. The method according to claim 12, further comprising:
   providing said radially extending brush cap with an upwardly extending ridge and providing said deflectable finger with a lip section; and
   engaging said ridge with said lip section upon completion of said deflecting step.

14. The method according to claim 13, further comprising:
   disengaging said lip section from said ridge; and
   axially removing said vent cover from said motor bracket following said disengaging step.

* * * * *